(12) United States Patent
Ahas (10) Patent No.: US 12,555,154 B2
(45) Date of Patent: Feb. 17, 2026

(54) SYSTEM AND METHOD FOR DYNAMICALLY DISPLAYING IMAGES ON ELECTRONIC DISPLAYS ACCORDING TO MACHINE-LEARNED PATTERNS

(71) Applicant: Subfiber OÜ, Tallinn (EE)

(72) Inventor: Ahto Ahas, Tallinn (EE)

(73) Assignee: Subfiber OÜ, Tallinn (EE)

( * ) Notice: Subject to any disclaimer, the term of this patent is extended or adjusted under 35 U.S.C. 154(b) by 0 days.

(21) Appl. No.: 16/542,920

(22) Filed: Aug. 16, 2019

(65) Prior Publication Data

US 2021/0049666 A1    Feb. 18, 2021

(51) Int. Cl.
*G06Q 30/00* (2023.01)
*G06Q 30/0601* (2023.01)
*G06F 3/04845* (2022.01)

(52) U.S. Cl.
CPC ... *G06Q 30/06311* (2025.08); *G06Q 30/0627* (2013.01); *G06Q 30/0631* (2013.01);
(Continued)

(58) Field of Classification Search
CPC . G06Q 30/0601–0643; G06Q 30/0631; G06Q 30/0641; G06Q 30/0627; G06Q 30/06311; G06F 3/04845
See application file for complete search history.

(56) References Cited

U.S. PATENT DOCUMENTS 7,921,071 B2 *   4/2011   Hicks ................. G06N 5/02
                                                                706/52
8,065,254 B1 *  11/2011   Das ................... G06Q 30/0631
                                                                706/46
(Continued)

FOREIGN PATENT DOCUMENTS

AU       2010256641 A1    12/2010
WO         02/079942 A2   10/2002

OTHER PUBLICATIONS

Prateek, P. (2016). Intelligent model for image-based recommendation system (Order No. 10307436). Available from ProQuest Dissertations and Theses Professional. (1868507374). Retrieved from https://dialog.proquest.com/professional/docview/1868507374?accountid=131444.*
"Learning to Style-Aware Bayesian Personalized Ranking for Visual Recommendation," by Ming He, Shaozong Zhang, and Qian Meng, IEEE Access 7: 14198-205, IEEE, Feb. 8, 2019 (Year: 2019).*

(Continued)

*Primary Examiner* — Anne M Georgalas
(74) *Attorney, Agent, or Firm* — ICE MILLER LLP; Justin D. Swindells (57) ABSTRACT

An embodiment of the disclosure provides a system for recommending at least one product to a user device. The system is configured to: (a) receive N product descriptions, each product description in the N product descriptions including an image; (b) extract, for each image in the N product descriptions, a plurality of features including machine-understandable visual parameters; (c) arrange a subset of the N product descriptions relative to a surface in a grid-like manner according to the machine-understandable visual parameters; (d) providing, to the user device, the grid-like arrangement of the subset of the N product descriptions; (e) receive, from the user device, signals indicating an interaction relative to the surface; (f) in response to the signals, rearrange the subset of the N product descriptions relative to the surface; and (g) send, to the user device, the rearranged subset of the N product descriptions.

19 Claims, 7 Drawing Sheets

(52) U.S. Cl.
CPC ... *G06Q 30/0643* (2013.01); *G06Q 30/06435* (2025.08); *G06F 3/04845* (2013.01)

(56) References Cited

U.S. PATENT DOCUMENTS

| | | | | |
|---|---|---|---|---|
| 9,537,802 | B2* | 1/2017 | Caine | G06Q 30/0643 |
| 9,721,291 | B1* | 8/2017 | Kennis | G06Q 30/0643 |
| 9,817,846 | B1* | 11/2017 | Srinivasan | G06F 16/24578 |
| 9,830,630 | B2* | 11/2017 | Chen | G06Q 30/0631 |
| 10,019,143 | B1* | 7/2018 | Haitani | G06F 3/04883 |
| 10,049,139 | B2* | 8/2018 | Fox | G06F 16/24578 |
| 10,102,559 | B1* | 10/2018 | Jain | G06Q 30/0631 |
| 10,157,231 | B1* | 12/2018 | Franke | G06Q 30/0625 |
| 10,366,440 | B2* | 7/2019 | Agrawal | G06Q 30/0201 |
| 10,726,464 | B2* | 7/2020 | Sherman | G06Q 30/0643 |
| 10,891,676 | B1* | 1/2021 | Kan | G06Q 30/0643 |
| 10,922,737 | B2* | 2/2021 | Guo | G06Q 30/0643 |
| 10,943,178 | B1* | 3/2021 | Gao | H04L 67/53 |
| 10,956,995 | B1* | 3/2021 | Fleischman | G06Q 50/14 |
| 11,016,964 | B1* | 5/2021 | Hinegardner | G06F 16/2428 |
| 11,100,400 | B2* | 8/2021 | Fang | G06N 3/084 |
| 11,232,511 | B1* | 1/2022 | Zehr | G06V 20/70 |
| 11,605,117 | B1* | 3/2023 | Zavaleta | H04N 21/251 |
| 2010/0250336 | A1* | 9/2010 | Selinger | G06Q 30/0643 705/26.7 |
| 2010/0321411 | A1* | 12/2010 | Paek | G06F 3/04883 345/173 |
| 2014/0365336 | A1* | 12/2014 | Hurewitz | G06Q 30/0625 705/26.62 |
| 2017/0091319 | A1 | 3/2017 | Legrand et al. | |
| 2017/0124624 | A1 | 5/2017 | Agrawal et al. | |
| 2019/0080207 | A1* | 3/2019 | Chang | G06N 3/0427 |
| 2019/0130285 | A1 | 5/2019 | Snyder et al. | |
| 2019/0251446 | A1 | 8/2019 | Fang | |
| 2019/0251612 | A1* | 8/2019 | Fang | G06N 3/0475 |
| 2019/0333075 | A1* | 10/2019 | Justin | G06V 40/20 |

OTHER PUBLICATIONS

"Novel Item Recommendation by User Profile Partitioning", by Mi Zhang and Neil Hurley, 2009 IEEE/WIC/ACM International Conference on Web Intelligence and Intelligent Agent Technology—Workshops (Year: 2009).*

"Case-studies on exploiting explicit customer requirements in recommender systems," by Markus Zanker and Markus Jessenitschnig, User Modeling and User-Adapted Interaction (2009) 19:133-16 (Year: 2009).*

International Search Report and Written Opinion in International Patent Application No. PCT/IB2020/057713, mailed Dec. 1, 2020 (14 pages).

International Search Report and Written Opinion of International Searching Authority for Application No. PCT/ B2020/057712, mailed Nov. 5, 2020 (9 pages).

International Search Report and Written Opinion in International Application No. PCT/EP2020/072870, mailed Sep. 1, 29, 2020 (13 pages).

Photographs for iOS and iPadOS—Apple; retrieved from https://www.apple.com/ios/photos on Jan. 16, 2020 (14 pages).

* cited by examiner

SYSTEM AND METHOD FOR DYNAMICALLY DISPLAYING IMAGES ON ELECTRONIC DISPLAYS ACCORDING TO MACHINE-LEARNED PATTERNS

TECHNICAL FIELD

The present disclosure relates to online shopping recommendations and more specifically to systems and methods for recommending fashion products to shoppers based on machine-learned visual characteristics of the fashion products that are appealing to the shoppers.

BACKGROUND

Online shopping and online marketplaces are mainstays for retail outlets with most brick-and-mortar retail outfits providing at least a basic online shopping experience. Although online shopping is prevalent in society, e-commerce keyword-based search technologies are suited to finding products with well-defined and well-describable objective features and attributes. Examples of well-defined features include a brand name, a merchant-defined category, color, and other product attributes defined within the product's metadata. Other product attributes can include, e.g., sleeve length of a product, a model number, and a description assigned to the product by a designer or a merchant. A text search can find these objective features or attributes within previously recorded keywords (or their synonyms). Upon such a search, products matching the text string being searched upon is displayed on one or more static pages. The products can be ordered by relevance to keywords and/or other factors, such as sales popularity.

Although efficient in finding products with well-defined product attributes, keyword-based searching is not effective when attributes of products on the online stores are not available. For example, an attribute's description may be vague or can apply to dissimilar products or styles. In these situations, a desired or preferred product may not be presented to an online shopper.

While the function of fashion products (e.g., "dress" or "trousers") is easily identified by a keyword, the inherently visual and thus subjective nature of fashion is almost impossible to describe with words. In an example, "floral" can mean a style or many different patterns. Similarly, "urban" can mean a use case, a style, or a visual look. Furthermore, both "floral" and "urban" can mean different things to different people. There is a subjective nature to fashion, and the words used to describe a fashion product does not fully capture the essence of the fashion product.

Visual-based searching can be applied to augment the shortcomings of keyword-based search by having shoppers upload an image of a product (a "seed" or starting image), but current visual similarity-based search technologies are limited to finding only products that the shopper already has an image of, so this requires the shopper to input into the search engine a starting image that reflects already what the shopper is looking for. These conventional technologies do not let the shoppers find or discover new products they have not seen yet, or captured an image of, or perhaps are not even aware exist. Shoppers still need to resort to inefficient text-based search or category-based browsing through all the existing products (often millions) to find the relevant ones, a frustrating, time-consuming, and overwhelming experience that often results in the shopper abandoning the search without finding a product of interest.

Category-based browsing or text-based search does not prioritize the products shown by visual desirability, which can be important for something as visual as fashion; and visual-similarity based search only prioritizes the visually matching products, but cannot prioritize the products by desirable styles.

For the shoppers browsing for the products to buy, the order of products displayed is random with regard to visual desirability and visually pleasing items are infrequent. As a result, shopping fatigue can kick in, resulting in the shopper often quitting the shopping process before finding the desirable product to buy. Hence, current e-commerce is more suitable for finding products that fulfill a desired function (e.g., "brown trousers"), but it is not suitable for discovering visually-appealing new products. In contrast, when shopping in physical stores, shoppers often discover appealing products they did not plan to buy when they entered the store, resulting in a much higher per-visit total shopping spending compared to e-commerce.

The aforementioned shortcomings of current search technologies and of resulting browsing activity result in limitations on the data that can be collected about users' visual preferences (e.g., by products viewed). A low number of pleasing products means less data points. Limited information on products' stylistic features limits inference. A static display of products limits hypothesis-testing.

Attribute, text, and tag based searching can be effective if relevant features of products that affect a user's choice are well-describable and universally defined across shoppers, designers, retailers, manufacturers, etc., so that relevant keywords can be generated beforehand. This implies that the fashion industry should have a universal taxonomy across different cultures and languages. However, as fashion trends change quickly, such universal taxonomy, even if created, would instantly become obsolete. Therefore, attribute-based search is not suitable for finding products where visual features are relevant to user choice. These features can be difficult for the user to describe, too numerous to be pre-generated, and too ambiguous across customers since different customers can describe the same feature in different ways.

Additionally, visual features are oftentimes not consciously understood by the user. The user can recognize an item she likes when she sees it, but she cannot verbalize what is it about the item that she likes or that is actually pleasing. In addition, too many different visual features can be appealing to the user to describe in search term, even if the user could describe them. These shortcomings to describing products are typical for fashion and design products. Besides fashion and design, other highly subjective and personalized areas such as interior design, home decor and furnishings, floor plan layouts, landscaping, works of art, architecture, or any area where the subjective user's "look and feel" are invoked, suffer from the same shortcomings.

Current e-commerce solutions aim to provide visually relevant products with the help of collaborative filtering recommendation techniques. When a user has expressed interest in an item (e.g. clicked onto product detail page), recommendation is served for similar items not based on identifiable features but based on aggregate opinion of other shoppers interested in that item. Collaborative filtering can have several drawbacks. One drawback is large amount of previous user interactions is needed to provide the recommendation, and this is not always available for less popular or very new products or products that have a short burst of life. Fashion is an area with a very "long tail" (i.e. supply of a large variety of products, each produced in small quantities, and each generating too little data per product). Another drawback is that collaborative-based recommendations are less sensitive to individual tastes, as it aggregates over all other users' opinions, whereas fashion is one of the most individualistic product areas. Another drawback is current systems do not create accurate user taste profile—for each item on an item-by-item basis; rather, recommendations are given only based on the current or historic items viewed. The limitations of current e-commerce and related search technologies do not allow the technologies to assess the shoppers' potential stylistic interests if they have not already shown specific interest in these styles (i.e. when they have not discovered the desirable items, while discovery has been made impossible by the same e-commerce systems).

SUMMARY

An embodiment of the disclosure provides a system for recommending at least one product to a user device. The system includes a processor and a non-transitory computer readable medium storing instructions thereon such that executing the instructions causes the system to perform the following: (a) receiving N product descriptions, each product description in the N product descriptions including an image; (b) extracting, for each image in the N product descriptions, a plurality of features including machine-understandable visual parameters; (c) arranging a subset of the N product descriptions relative to a surface in a grid-like manner according to the machine-understandable visual parameters; (d) providing, to the user device, the grid-like arrangement of the subset of the N product descriptions; (e) receiving, from the user device, signals indicating an interaction relative to the surface; (f) in response to the signals, rearranging the subset of the N product descriptions relative to the surface; and (g) sending, to the user device, the rearranged subset of the N product descriptions.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Embodiments of the disclosure provide a system for helping users discover visually pleasing items that are relevant to the user's subjective and individualized preference from among a large number of products. The system can expose shoppers or users to as many visually pleasing items as possible. The system can also maximize acquisition of user preferences to enable the exposing of users to as many visually pleasing items. The system can refine selection of items displayed to match users' preferences more accurately. The system can allow users to re-define their stylistic preferences, refine their search when they change their mind (e.g., discover new styles they like, but did not know of previously) during a browsing session. The system can reduce cognitive load placed on users during a shopping process.

Embodiments of the disclosure provide a system for enhancing a user's shopping experience by engaging the user as a shopper and as a recommender or recommendation artificial intelligence (AI). The system can propose to the user pleasing options but then include a random item or an item that might or might not be the most pleasing to the user. Based on the user's interaction or lack of interaction with the random item or item that might not be the most pleasing to the user, the recommendation AI can update its profile on the user or update its perception of the user's preferences. In other words, the AI can test a hypothesis by displaying a certain item to the user, and then watch or monitor how that user interacts or does not interact with the item (e.g., does the user hover over that item, or select it immediately, return focus to the item multiple times, or zoom in to focus on that item, etc.) to update the learning model.

Embodiments of the disclosure can reduce cognitive load placed on the user in the shopping process since the user is not required to enter a search query or formulate specific search criteria. Instead user preferences are inferred from interaction behavior. That way, the user does not have to have a well-defined search goal in mind, not even for a hard-to-describe mental image. In some embodiments, the user is interactively probed for conscious and subconscious preferences to direct her towards items that are pleasing. Embodiments of the disclosure provide a tool for users to communicate visual style preferences without using or inputting words, but rather purely by interacting with images (i.e., the "Visual Language of Search").

Figure 1:
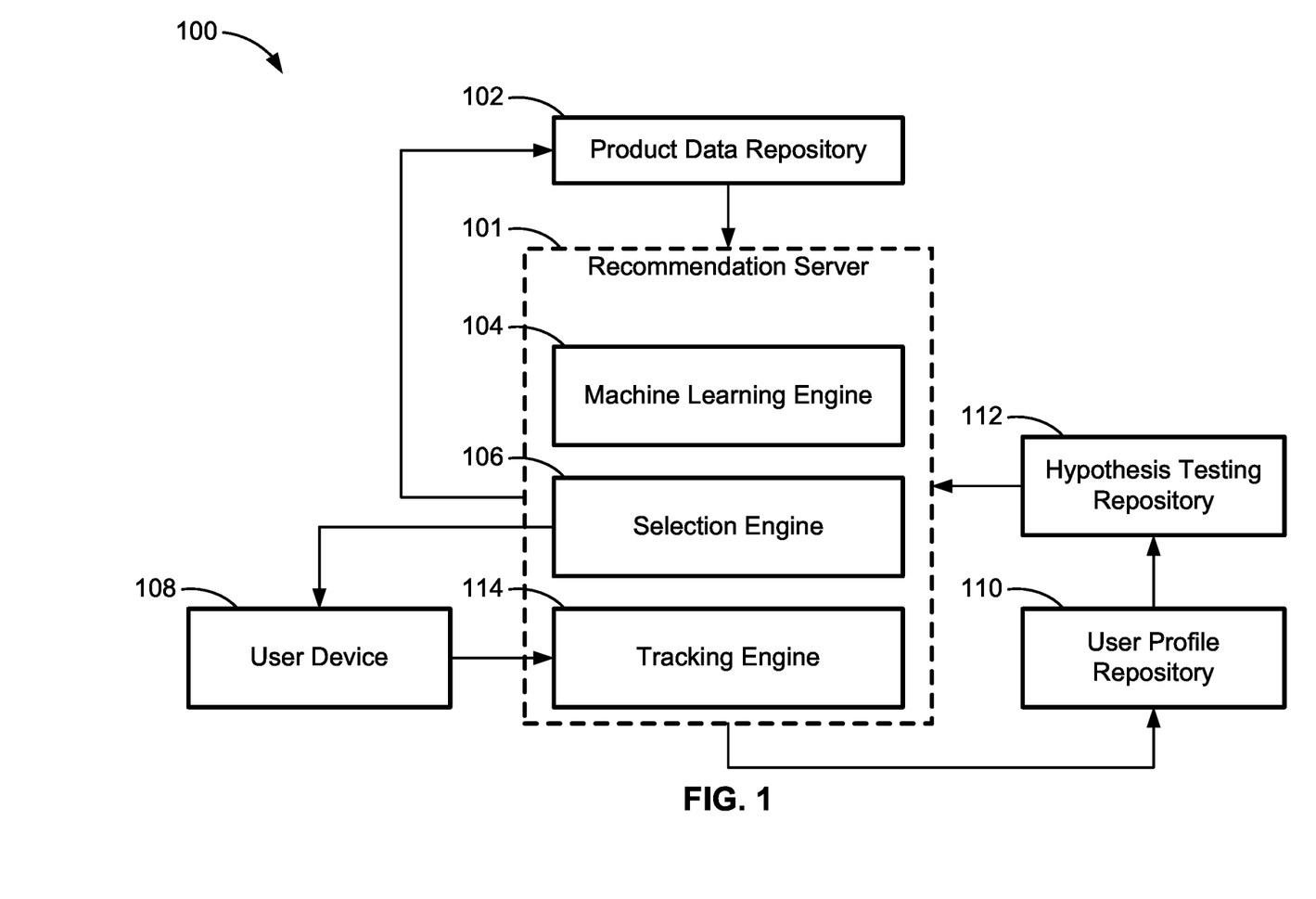
FIG. 1 illustrates a system for recommending a product or products to a user according to an embodiment of the disclosure.

FIG. 1 illustrates a system 100 for recommending a product or products to a user according to an embodiment of the disclosure. The system 100 includes a recommendation server 101, one or more data repositories or databases (e.g., product data repository 102, user profile repository 110, and hypothesis testing repository 112), and a user device 108. Each of the recommendation server 101, the user device 108, and the one or more repositories are computing devices with a processor and a non-transitory computer readable medium. Examples of the user device 108 can be a tablet computer, a laptop computer, a smart phone, a smart watch, any computing device having at least a human-machine input interface and an electronic graphical display, and so on.

The recommendation server 101 includes a machine learning engine 104, a selection engine 106, and a tracking engine 114. An engine is a combination of hardware and software for realizing a certain functionality. The machine learning engine 104 can be a neural network implementation for receiving product description and images and providing product features. The selection engine 106 provides the user device 108 with a selection of products. The tracking engine 114 tracks user interaction with the selection of products. The tracking can include zooming patterns of the user, the clicking on a product, providing a rating on a product, and so on. The machine learning engine 104, the selection engine 106, and the tracking engine 114 can be implemented on the same hardware.

The product data repository 102 stores product description and/or product features. Examples of a product description includes an image, a keyword description, a phrase description, metadata, etc. Examples of product features include machine-understandable visual parameters such as shape of edges, visual patterns, color, entropy, and so on.

The user profile repository 110 stores user preferences. The hypothesis testing repository 112 stores a next hypothesis for the selection engine 106 based on the user preferences in the user profile repository 110.

Figure 2:
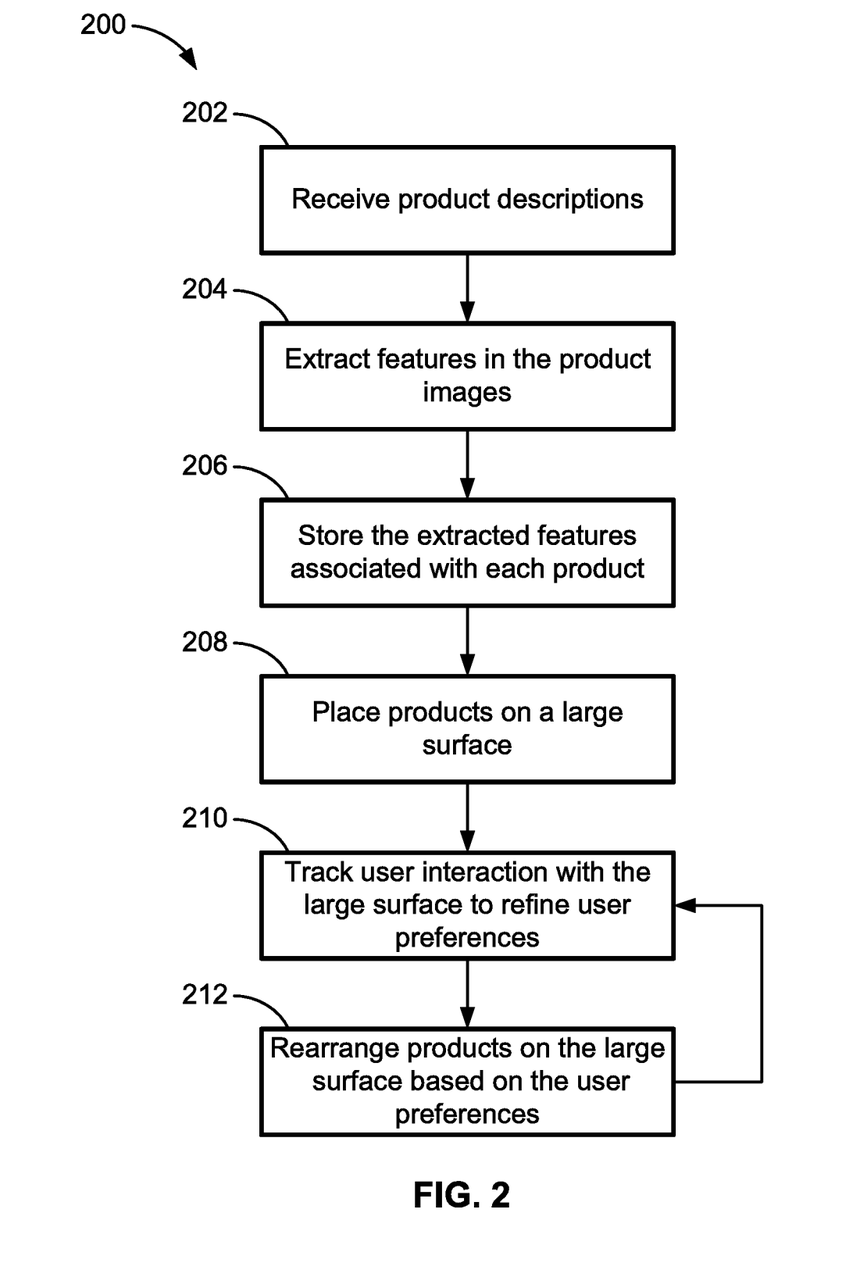
FIG. 2 is a block diagram showing steps for recommending products to a user according to an embodiment of the disclosure.

FIG. 2 is a block diagram showing steps 200 for recommending products to a user according to an embodiment of the disclosure. At step 202, the machine learning engine 104 of the recommendation server 101 receives product descriptions. The product descriptions can be obtained from the product data repository 102. The product descriptions can also be received from another computing product, e.g., through a desktop, laptop, or mobile device of a store employee. The product descriptions can contain, for each product, a product image, keyword description, and other metadata.

At step 204, the machine learning engine 104 of the recommendation server 101 extracts features in the product images, performing a computer vision analysis of the product images. The machine learning engine 104 extracts a large number of features characterizing the visual quality of the products. For example, for fashion products, one or more of the following features can be characterized: pre-defined features (such as, sleeve length, collar type etc. or affinity to known fashion styles), visual hyper-parameters (such as, color or entropy), or machine-understandable visual parameters (such as, shape of edges at smaller or larger scale, visual patterns within the items, etc.). The machine-understandable visual parameters can be numerous, e.g., having 1000 or more qualities defined by the machine learning engine 104, and can lack a human-defined counterpart that is classically used in determining visual similarity. The extracted features, including a combination of the extracted features, will form the basis of understanding products in the system 100 as well as user preferences.

At step 206, the machine learning engine 104 stores the extracted features associated with each product in the product data repository 102.

At step 208, the selection engine 106 of the recommendation server 101 places and arranges products on a large surface to be displayed to the user. The large surface can be a large rectangular or square grid on an electronic display of the user device 108. The large surface can also be a large spherical grid with a curvature. The items in the grid can be arranged in a table arrangement as in columns and rows, or in any regular or haphazard arrangement within the grid. The grid does not have to be a regular shape, but rather represents the visual canvas area upon which items are displayed to the user/shopper. Those skilled in computer programming will appreciate that the grid is a program abstraction to instruct a display engine or module where to place an item for display. The large grid is provided to the user device 108 for display. The large grid is scrollable on a screen of the user device 108 in one or more directions, e.g., vertically, horizontally, diagonally, and so on, using a human-machine interface of or associated with the user device 108. In this way it is possible to discern at least eight, ten, twelve, or fourteen distinct scrolling directions. The page on which the large grid is shown on the user device 108 can support a wide array of zoom levels, from hundreds of very small images per page up to few very detailed images per page. The page can support interactions such as "pinch zoom" that allows zooming in on an area of interest in the grid using a touch interface on the screen of the user device 108. In addition to touching, other examples of interactions can further include gestures and mouse clicks.

The screen of the user device 108 is an example of an electronic display device according to some implementations of the disclosure. The electronic display device is configured to display to the user/shopper the large grid. Other examples of the electronic display device include projection devices, holographic displays, and so on.

The products are arranged in the grid so that maximum amount of information on user preference can be captured by following her actions on the grid. This can include areas high on specific parameters, or a mixture of parameters at different zoom levels. A zoomable grid provides advantages, e.g., on lower zoom levels, many more products than in typical navigation can be shown at once. Showing more products at once can expose the user to more products and thus also more visually pleasing products. As many stylistic decisions can already be taken on low detailed view, this allows the user to quickly make an initial selection from large variety of stylistic options. At the same time, the user can further refine interest by zooming in on products that are potentially relevant. In contrast, the current e-commerce layout exposes the users to: (1) a limited number of products (that does not let the user see products that may match their style interests), and (2) often already filtered by a functional category (that does not expose the user to products outside the chosen category). The low-detail zoom levels allow the user to easily travel between different fashion dimensions, such as category, style, color, shape etc.

Another advantage includes using zoomable grid navigation, the user generates large amount of preference data quickly. Micro-actions, such as—but not limited to—which areas did the user examine longer, where did she zoom in, how quickly did she zoom out again, clicking, or liking a product, etc., can be monitored to understand user preferences as each area of the grid displays products with known extracted features. Determining whether the user zoomed out all the way or how quickly the user zoomed out is a function of the screen size of the user device 108. A large monitor will have more products in a zoomed out state than a screen of a smartphone. Capturing and monitoring a user's micro-actions, along with generating a time sequence of the micro-actions along a timeline, seek to model how a sales person watches a prospective client in a retail store to understand that shopper's preferences based on what the shopper focuses on, how long the shopper focuses on a particular item, what they express a disinterest in, and the like. These micro-actions, optionally along with their time sequence (e.g., to see a time period between interactions, or how long the user lingers on a particular item or particular area of the screen), can be fed into and ingested by the AI model to improve its learning and refine its selection of items to be displayed on the screen, and which displayed items to replace with items that have a higher chance of being visually interesting to the user/shopper.

While the grid of products displayed initially seems to include random set of products, these can be strategically chosen by the selection engine 106 to maximize exposing the user efficiently to a number of styles, to help the user find visually the closest match to their desired product styles.

The grid can also be arranged into areas of stylistically similar products, based on category, color, style or other important dimension. This functions as a navigation aid to the user and allows to indicate preferences by scrolling actions.

As more user preferences are captured by the tracking engine 114, the grid will be adapted to contain mostly items sought by or matching the user's preferences but can also include a number of escape items. Escape items represent a different style and can be used to indicate saturation with current choice and desire to explore radically different options. In some instances, an escape item is not radically different but is merely an item that includes a feature positively correlating with the user's preferences but not necessarily within the user's preferences.

Zooming in and out can be performed on the user device 108 by a pinch or air gesture or any other method on the user device 108, such as a mouse wheel movement, a virtual reality controller, a game controller, and so on.

At step 210, the tracking engine 114 of the recommendation server 101 tracks user interaction with the large surface to refine user preferences. The tracking engine 114 captures activity on the user device 108 and populates the user profile repository 110. Activity on the user device 108 includes how long specific products are displayed on the user device 108, zooming in or zooming out on the large surface, clicking on products displayed on the large surface, rating products displayed on the large surface, scrolling away from products displayed on the large surface, hovering over a certain product on the large surface, and so on. Optionally, the tracking engine 114 can include an imaging device such as an iris-tracking device that is configured to track the user's irises to correlate the user's iris positions with corresponding items or areas on the screen to further learn what the user's preferences are. This can augment the model's learning while the user is not selecting or interacting with the screen, but rather scanning the items with their eyes. While a lingering without taking any action could be indicative of an interest or disinterest, iris tracking aids the model in discerning whether the user is interested or disinterested in a particular item. For example, focusing the iris on a particular item or area of the screen can be indicative of an interest in the item, so the lingering can be fed into the model as indicative of an interest level. If the user's iris is scanning around the entire display area, without focusing on any particular item or area, this can be indicative of a disinterest in any of the items displayed, so the selection engine 106 can learn this behavior and replace a significant number or even all of the items shown on the screen even before the shopper makes any input relative to the screen. At step 212, the selection engine 106 of the recommendation server 101 rearranges products on the large surface based on the user preferences. In an embodiment, upon clicking a product image via the user device 108, a number of product images surrounding the product clicked on will be changed to new product images. The new product images chosen to display match more closely the user's stylistic preference by analyzing her stylistic preference from micro-actions or activities captured at the large surface (or zoomable grid). The new product images shown to display can also be selected to display a variation of products that help the user further refine their stylistic preference, i.e., to provide additional insight into user preferences.

Steps 210 and 212 can be performed repeatedly to either refine the selection around a certain visual style by clicking on mostly similar items or expand possibilities and explore by clicking on items along a certain visual direction.

In an embodiment, the system 100 actively learns user preferences. For example, when a user clicks on an item, it typically expresses likability. However, the user may not like the item in its entirety but just some of its features. The item may also be in the desired visual direction but not far enough (or too far). Also a single click on an item may not tell which features the user liked. With some embodiments of the disclosure, desirability of different features of a product can be tested by displaying products emphasizing one or another feature of the liked product and observing further clicks on the user device 108.

In an embodiment, the selection engine 106 provides a dynamic map layout of the large surface to the user device 108. When the user scrolls the map, newly visible portions of the map are dynamically generated by the selection engine 106 based on the information gathered on user intent and preferences so far. The data can include micro-actions and activities of the user, such as direction of ongoing scroll (when items are placed on the map not randomly but based on their stylistic or visual features), zoom-in areas, and others; or actions like previously collected item clicks. Items displayed in the newly generated portions are chosen to be either most pleasing or most informative. Only previously unseen areas are dynamically generated while the areas that the user has seen at sufficiently detailed zoom level will stay unchanged. Dynamic map layout can also be combined with rearranging products as a user clicks or interacts with a product as described above in step 212.

In an embodiment, the tracking engine 114, the selection engine 106 and the machine learning engine 104 cooperate to create a recommender AI. The recommender AI includes a set of algorithms that infer user preferences from a user's stream of actions and micro-actions during browsing and proposes an optimal layout of products to be shown to the user (both for purchase as well for refining understanding of user preferences). A source of user preferences is the set of fashion features extracted from the products and user's behavior towards these products. When a user clicks on a product with certain feature set (e.g. Dress, red, Gucci, country-style, bell-shaped etc.), the recommendation server 101 strengthens hypothesized user preference towards these features.

In an implementation, a sequence of interactions, rather than only the last click, is taken into account—for example, persistent selection of a certain feature (clicking dress; dress; dress) can indicate strong preference whereas intermittent selection (clicking dress; trousers; dress) can indicate indifference to that dimension (in the example: category).

In an implementation, negative information can also be taken into account—when a user is shown items with certain features and chooses to ignore these (e.g., not click on, scroll away, zoom out, and so on), the recommendation server 101 weakens hypothesized preference towards these features. That is ignoring certain products can be interpreted as a negative preference. Many different such criteria can be used, the above serves as examples of general principle—user's fashion preferences will be inferred from her sequence of actions towards products with known fashion features.

Figure 3:
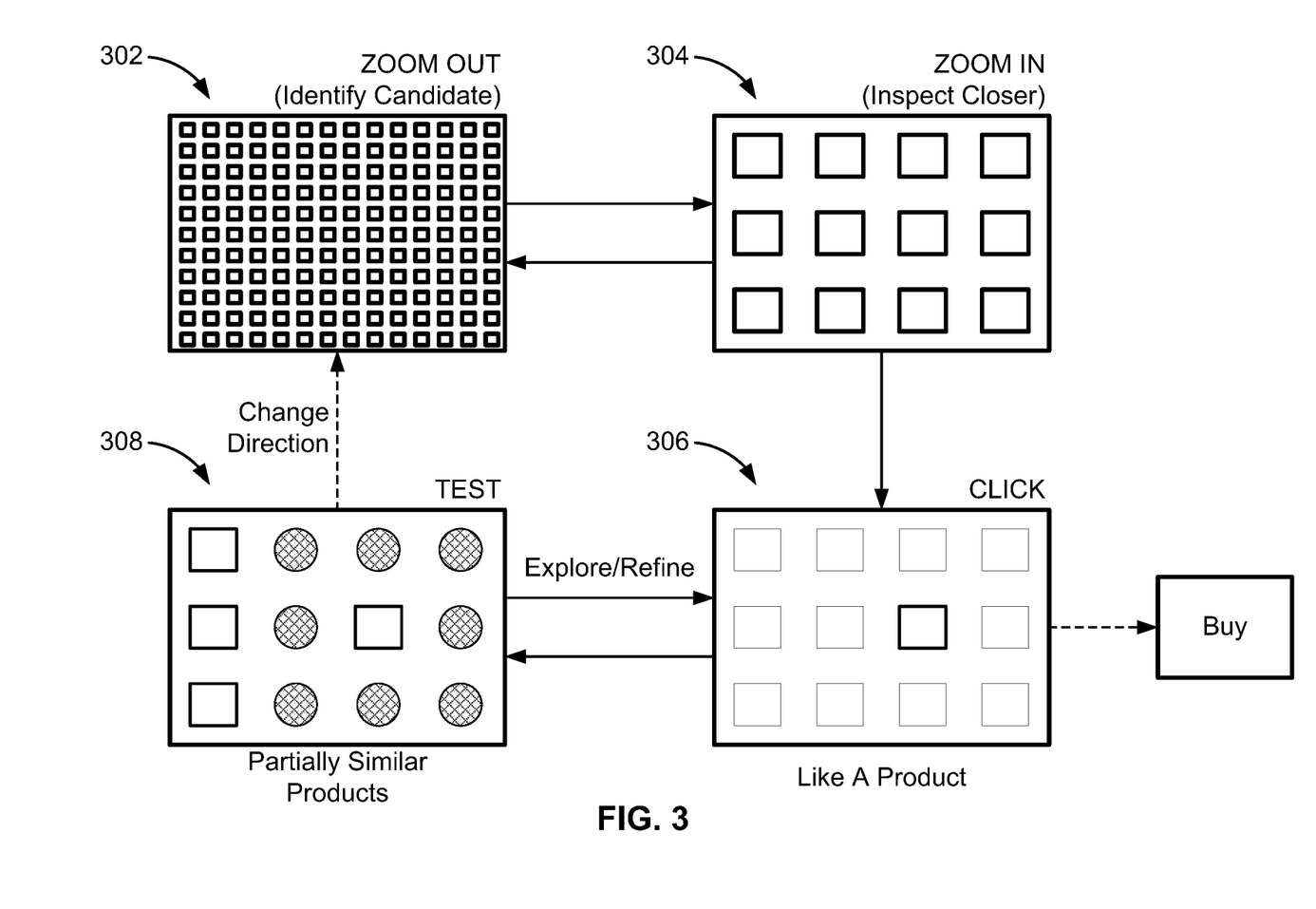
FIG. 3 illustrates an example interaction on a user device according to an embodiment of the disclosure.

FIG. 3 illustrates an example interaction on a user device according to an embodiment of the disclosure. In FIG. 3, item 302 indicates a zoomed out version of products arranged on a large surface. Item 304 indicates that the user zooms into a specific area within the large surface to inspect products within that area more closely. Item 306 indicates that the user clicks on a specific product, which is interpreted by the recommendation server 101 as the user liking the product. Item 308 shows that in response to the user clicking on the specific product, neighboring products around the specific product are updated to partially similar products. In an implementation, instead of updating neighboring products around the specific product, the recommendation server 101 presents the user with a new selection of products in response to the user clicking on the specific product. The new selection of products can replace all products on the large surface. The new selection of products can replace some of the products on the large surface.

In an implementation, in response to the user clicking on the specific product, the recommendation server 101 can append the new selection of products to the large surface, enlarging the large surface such that a total number of products arrange on the large surface is greater than the number before the user clicked on the specific product.

From item 308, the user can continue clicking on products displayed within updated product list, which will allow the recommendation server 101 to continue refining the user's preference. Also the user can choose to buy a certain item at item 306. Also the user can zoom out of the specific location on the large surface, which returns the user to item 302, indicating to the recommendation server 101 that the user is changing directions or looking for a different style.

Figure 4:
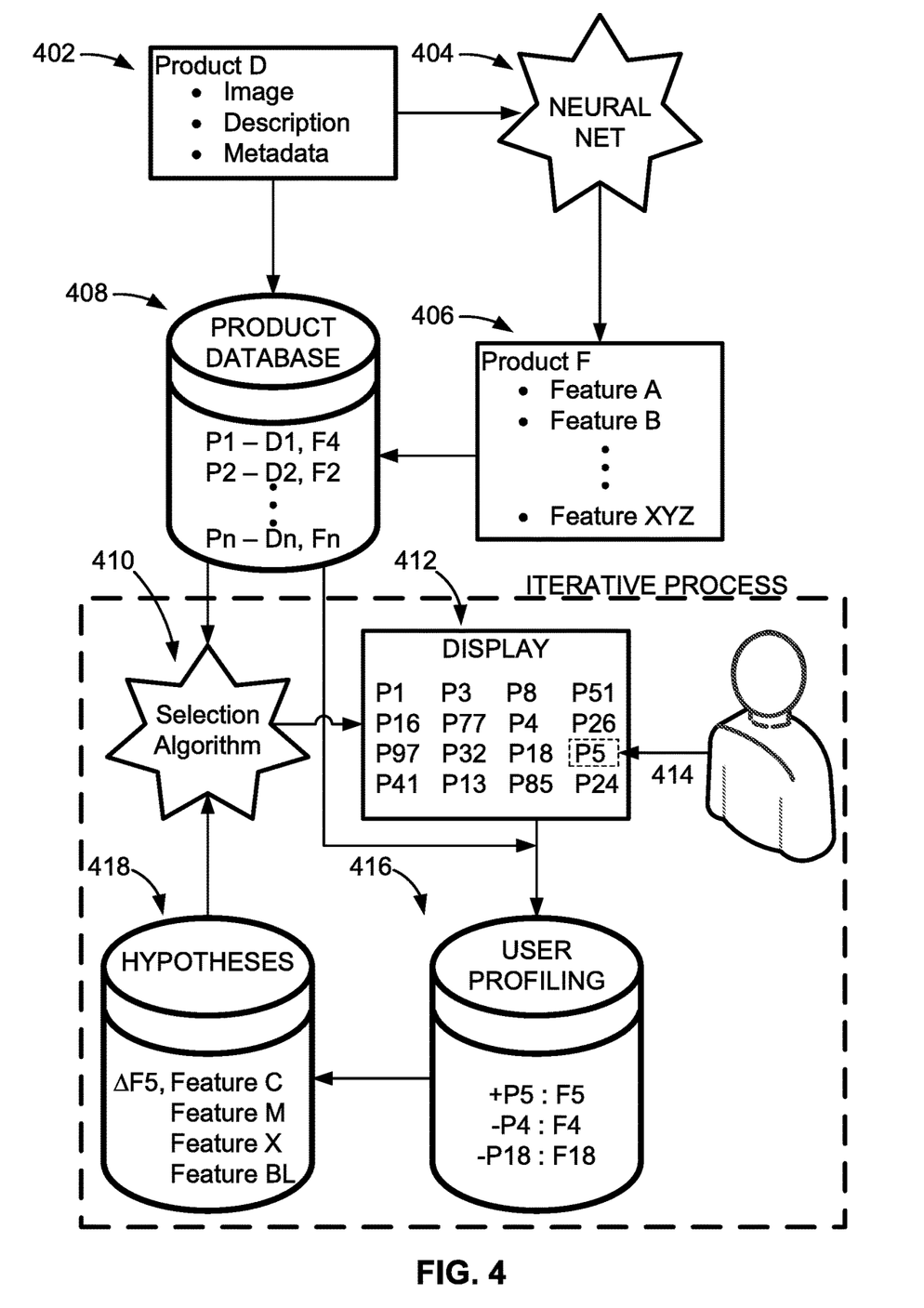
FIG. 4 illustrates an example system for recommending a product or products to a user according to an embodiment of the disclosure.

FIG. 4 illustrates an example system for recommending a product or products to a user according to an embodiment of the disclosure. In FIG. 4, a product description (Product D 402) which includes an image, a keyword description, and metadata is provided to a neural network 404 (e.g., the machine learning engine 104). The neural network 404 converts the Product D 402 to product features (Product F) which includes feature A, feature B, . . . feature XYZ. Both the Product D and the Product F are stored in the product database 408 (e.g., product data repository 102). In an embodiment, each product is linked to its respective description and its respective extracted features and stored in the product database 408. For example, P1-D1, F1 indicates that product P1 is linked to product description D1 and product features F1, and P2-D2, F2 indicates that product P2 is linked to product description D2 and product features F2.

The selection algorithm 410 (e.g., implemented by the selection engine 106) displays products on a large space, and the user can view the products on a display 412 (e.g., a screen of the user device 108). The display 412 can show the products in a grid. The user can click on a product, e.g., click 414 on product P5 presented on the display 412.

The user's click 414 as well as products within the product database 408 are used, e.g., by the tracking engine 114, to update the user's preferences, storing the preferences in a user profile. Positive preferences and/or negative preferences can be tracked by the tracking engine 114. An example of the user's preferences is provided in user profiling 416. The click 414 can be interpreted to indicate that one or more features F5 in product P5 is desirable or preferred, one or more features F4 in product P4 is undesirable, one or more features F18 in product P18 is undesirable, and so on. Preferred features stored in the user profile indicate the user's preference.

The tracking engine 114 in cooperation with the selection engine 106 can then take the information in user profiling 418 to adjust certain features in features F5 to depart from features F5. For example, features C, M, X and BL in F5 can be adjusted and stored in the hypotheses 418 (e.g., hypothesis testing repository 112). Once a next hypothesis is determined, then the selection algorithm 410 can find products within the product database 408 that meets the features within the next hypothesis. The selection algorithm 410 thus updates the displayed products on the display 412, and the process continues in an iterative manner.

Figure 5:
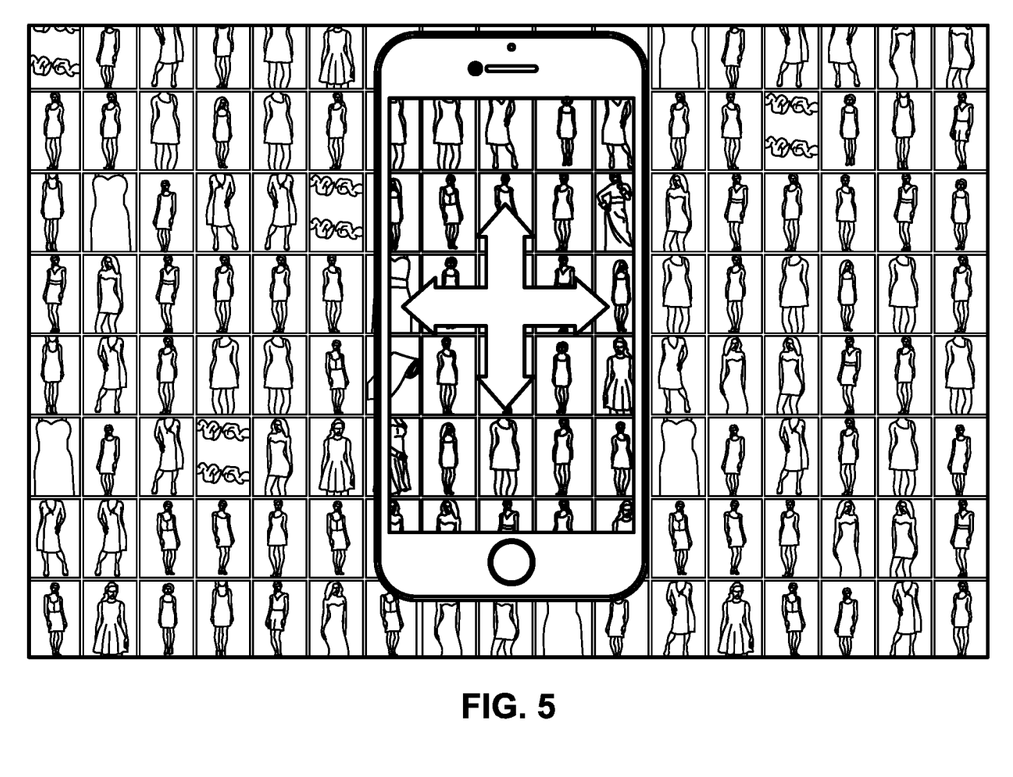
FIG. 5 shows an example of a mobile device showing a zoomed out view of different products that can be scrolled through, according to an embodiment of the disclosure.

FIG. 5 shows an example of a mobile device showing different products that can be scrolled through in a vertical and horizontal manner, according to an embodiment of the disclosure. The products are shown on the screen in a zoomed out manner based on the size of the screen.

Figure 6:
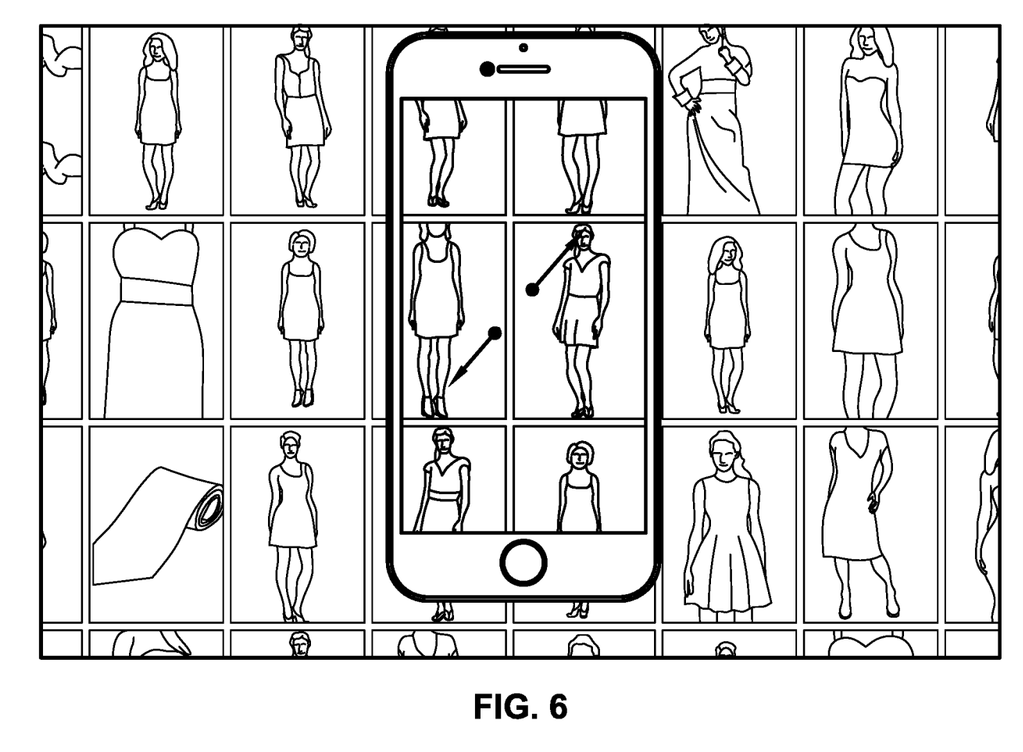
FIG. 6 shows a zoomed in version of a section of the different products shown in FIG. 5.

FIG. 6 shows a zoomed in version of a section of the different products shown in FIG. 5. The zoomed in version indicates that clothing with a same user preference style that may look different can be situated next to one another. FIG. 6 shows zoomed in view of the scrollable map for closer inspection of interesting items (to understand whether the user likes the item). The map may not replace product detail page where multiple views, brand, price and description are available.

Figure 7:
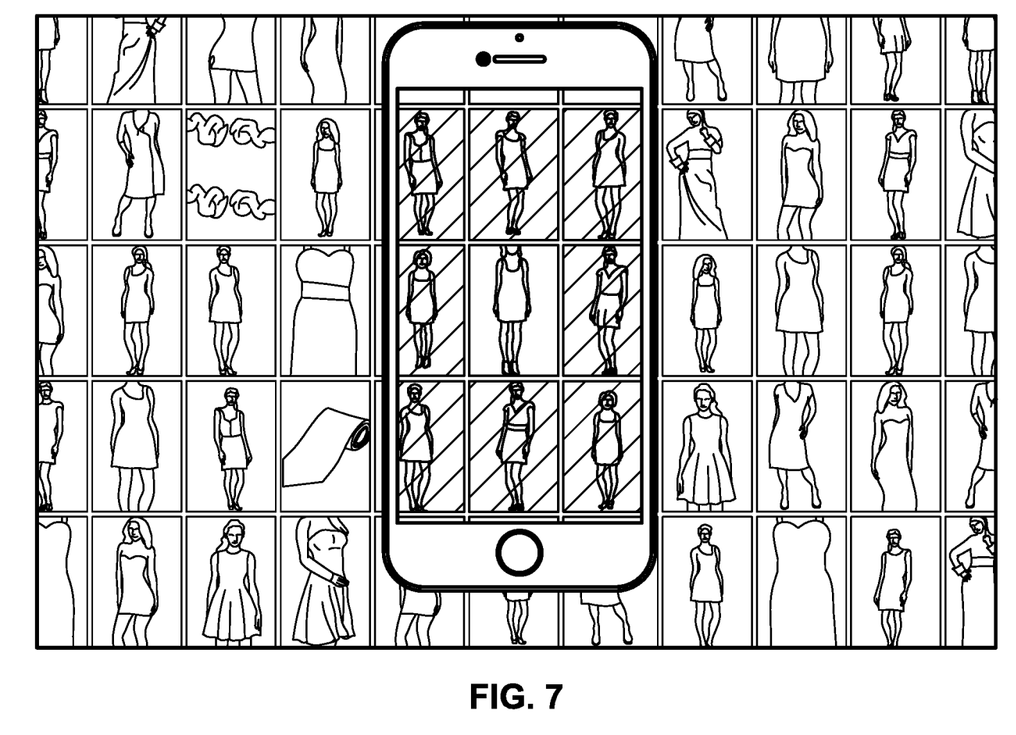
FIG. 7 shows effect of selecting a certain product in the different products of FIG. 5, according to an embodiment of the disclosure.

FIG. 7 shows that selecting a certain product updates the products around it to a more similar style according to learned user preferences. Upon clicking an item, product images around it (not limited to just immediate vicinity) change to related items that are either similar to the original item or only partially similar to allow exploration.

While the examples described herein have been made with reference to fashion and design, the concepts disclosed herein are equally applicable to any other highly subjective and personalized area including interior design, home decor and furnishings, floor plan layouts, landscaping, works of art, architecture, or any area where the subjective user's "look and feel" are invoked. An emphasis is placed on areas where a purchasing selection is based largely upon visual cues and a visual comparison of multiple possibilities arranged in the same visual display, where the options to be selected are iterated to become relevant to the individual purchaser's subjective tastes and preferences, which defy conventional categorization or tagging.

While the present disclosure has been described with reference to one or more particular embodiments and implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A system for recommending at least one product to a user of a user device, the system including a processor and a non-transitory computer readable medium storing instructions thereon such that executing the instructions causes the system to perform the steps comprising:

receiving N product descriptions, each product description in the N product descriptions including an image configured to be selected by clicking, gesturing, or touching via a touch interface;

extracting for each image in the N product descriptions, a plurality of features including machine-understandable visual parameters, the extracting including performing a computer vision analysis of the each image to extract the machine-understandable visual parameters characterizing a visual quality of a product feature in the each image, the visual parameters including shape of edges or visual patterns;

arranging a subset of the N product descriptions relative to a surface in a grid;

providing, to the user device for display thereon, the subset of the N product descriptions;

tracking, from the user device, signals indicating a sequence of interactions relative to the surface, each of the interactions including a micro-action among a plurality of micro-actions, the plurality of micro-actions including a scrolling action of the user relative to the grid and a click or touch action relative to the grid;

inferring, based on the tracking, one or more user preferences of the user of the user device and identifying one or more preferred features from among the plurality of extracted features that are associated with the one or more user preferences, the one or more user preferences comprising one or more product descriptions from among the subset of the N product descriptions;

in response to the signals, rearranging the subset of the N product descriptions relative to the surface, the rearranging including selecting a new image from a hypothesis testing repository and adding the new image to the subset of the N product descriptions, wherein the new image is an escape item representing a different preference that is not within the one or more user preferences;

monitoring how the user interacts or does not interact with the escape item; and sending, to the user device, the rearranged subset of the N product descriptions including a product description including the new image.

2. The system according to claim 1, wherein the subset comprises all of the N product descriptions.

3. The system according to claim 1, wherein rearranging the subset of the N product descriptions relative to the surface comprises:

removing from an area in the grid one or more products proximate to a first product description in the subset of the N product descriptions; and selecting, from the N product descriptions, replacement product descriptions to populate the area that contained the number of products removed, wherein features associated with the replacement product descriptions are related to features of the first product description, wherein the signals indicating an interaction with the surface includes a click or touch on or selection of the first product description.

4. The system according to claim 3, wherein at least one product in the replacement products includes a majority of features not related to features of the first product description.

5. The system according to claim 3, wherein features associated with the replacement product descriptions are related to features of the first product description and also related to preferred features in a user profile.

6. The system according to claim 1, wherein the visual parameters include color or image entropy.

7. The system according to claim 1, wherein the product description includes a keyword description of the each image.

8. The system according to claim 1, wherein the plurality of micro-actions further includes a zoom action relative to the grid.

9. The system according to claim 1, further comprising:

in response to the signals, determining a further new image based on the sequence of interactions, the sequence of interactions including at least one scrolling action and a plurality of click or touch actions relative to the grid;

replacing one of the product descriptions from the subset of N product descriptions with a product description including the further new image to produce a modified subset of product descriptions; and sending to the user device the modified subset of product descriptions.

10. The system according to claim 1, wherein the instructions, when executed, further cause the system to perform the steps comprising:

adjusting one or more features associated with the one or more user preferences; storing the adjusted one or more features in the hypothesis testing repository; and selecting the escape item from the hypothesis testing repository based on the adjusted one or more features.

11. A computer-implemented method for recommending at least one product to a user of a user device, comprising the steps of:

receiving N product descriptions, each product description in the N product descriptions including an image;

extracting, for each image in the N product descriptions, a plurality of features characterizing a visual quality of a product featured in the each image, the plurality of features including machine-understandable visual parameters, the visual parameters including shape of edges or visual patterns, the extracting including performing a computer vision analysis of the each image;

arranging a subset of the N product descriptions relative to a surface in a grid; providing, to the user device, the subset of the N product descriptions;

tracking, from the user device, signals indicating a sequence of interactions relative to the surface, each of the interactions including a micro-action among a plurality of micro-actions, the plurality of micro-actions including a scrolling action of the user relative to the grid and a click action relative to the grid;

inferring, based on the tracking, one or more user preferences of the user of the user device and identifying one or more preferred features from among the plurality of extracted features that are associated with the one or more user preferences, the one or more user preferences comprising one or more product descriptions from among the subset of the N product descriptions;

in response to the signals, rearranging the subset of the N product descriptions relative to the surface by:

removing from an area in the grid arrangement one or more products proximate to a first product description in the subset of the N product descriptions, selecting, from the N product descriptions, replacement product descriptions to populate the area that contained the number of products removed, wherein at least one feature associated with the replacement product descriptions are related to features of the first product description, wherein at least one other feature associated with the replacement product descriptions represents a feature from among the one or more preferred features;

selecting an escape item from a hypothesis testing repository and adding the new escape item to the subset of the N product descriptions, wherein the escape item represents a different preference that is not within the one or more preferred features, and wherein the escape item is represented as a new image; and monitoring how the user interacts or does not interact with the new image;

wherein the signals indicating an interaction with the surface includes a click or touch on or selection of the first product description;

the method further comprising the step of sending, to the user device, the rearranged subset of the N product descriptions including a product description including the new image.

12. A computer-implemented method for recommending at least one product to a user of a user device, comprising:
receiving N product descriptions, each product description in the N product descriptions including an image configured to be selected by clicking, gesturing, or touching via a touch interface;
extracting, for each image in the N product descriptions, a plurality of features including machine-understandable visual parameters, the extracting including performing a computer vision analysis of the each image to extract the machine-understandable visual parameters characterizing a visual quality of a product feature in the each image, the visual parameters including shape of edges or visual patterns;
arranging a subset of the N product descriptions relative to a surface in a grid;
providing, to the user device for display thereon, the subset of the N product descriptions;
tracking, from the user device, signals indicating a sequence of interactions relative to the surface, each of the interactions including a micro-action among a plurality of micro-actions, the plurality of micro-actions including a scrolling action of the user relative to the grid and a click or touch action relative to the grid;
inferring, based on the tracking, one or more user preferences of the user of the user device and identifying one or more preferred features from among the plurality of extracted features that are associated with the one or more user preferences, the one or more user preferences comprising one or more product descriptions from among the subset of the N product descriptions;
in response to the signals, rearranging the subset of the N product descriptions relative to the surface, the rearranging including selecting a new image from a hypothesis testing repository and adding the new image to the subset of the N product descriptions, wherein the new image is an escape item representing a different preference that is not within the one or more user preferences;
monitoring how the user interacts or does not interact with the escape item; and sending, to the user device, the rearranged subset of the N product descriptions including a product description including the new image.

13. The method according to claim 12, wherein:
the subset comprises all of the N product descriptions;
the machine-understandable visual parameters include color or image entropy;
the product description includes a keyword description of the each image; or
the plurality of micro-actions include a zoom action relative to the grid.

14. The method according to claim 12, wherein rearranging the subset of the N product descriptions relative to the surface comprises:
removing from an area in the grid one or more products proximate to a first product description in the subset of the N product descriptions; and
selecting, from the N product descriptions, replacement product descriptions to populate the area that contained the number of products removed, wherein features associated with the replacement product descriptions are related to features of the first product description,
wherein the signals indicating an interaction with the surface includes a click or touch on or selection of the first product description.

15. The method according to claim 14, wherein at least one product in the replacement products includes a majority of features not related to features of the first product description.

16. The method according to claim 14, wherein features associated with the replacement product descriptions are related to features of the first product description and also related to preferred features in a user profile.

17. The method according to claim 12, wherein the scrolling action is selected from one of at least three distinct directions, where one of the three directions is diagonal.

18. The method according to claim 17, wherein a number of the at least three distinct directions is a function of a screen size and/or screen resolution of an electronic display of the user device.

19. The method according to claim 12, further comprising:
in response to the signals, determining a further new image based on the sequence of interactions, the sequence of interactions including at least one scrolling action and a plurality of click or touch actions relative to the grid;
replacing one of the product descriptions from the subset of N product descriptions with a product description including the further new image to produce a modified subset of product descriptions; and
sending to the user device the modified subset of product descriptions.

* * * * *